United States Patent
Gorzitzke et al.

(10) Patent No.: US 6,588,566 B2
(45) Date of Patent: Jul. 8, 2003

(54) PRESSURE PLATE ASSEMBLY

(75) Inventors: Klaus Gorzitzke, Gochsheim (DE); Winfried Herterich, Wasserlosen (DE); Wolfgang Knauer, Königsberg (DE); Walter Lindner, Schwebheim (DE); Achim Link, Schweinfurt (DE); Gerhard Röll, Eisenheim (DE); Reinhold Weidinger, Kolitzheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/962,497

(22) Filed: Sep. 25, 2001

(65) Prior Publication Data

US 2002/0043439 A1 Apr. 18, 2002

(30) Foreign Application Priority Data

Oct. 7, 2000 (DE) .......................... 100 49 648

(51) Int. Cl.$^7$ ............................................... F16D 13/75
(52) U.S. Cl. ................. 192/70.25; 192/111 A
(58) Field of Search ................... 192/70.25, 111 A

(56) References Cited

U.S. PATENT DOCUMENTS

| | | | | |
|---|---|---|---|---|
| 5,645,153 A | * | 7/1997 | Weidinger | 192/111 A |
| 5,645,154 A | * | 7/1997 | Weidinger | 192/111 A |
| 5,690,203 A | * | 11/1997 | Link et al. | 192/111 A |
| 6,050,381 A | * | 4/2000 | Uehara et al. | 192/111 A |
| 6,123,180 A | | 9/2000 | Weidinger | 192/70.25 |
| 6,296,099 B1 | * | 10/2001 | Gochenour | 192/111 A |

\* cited by examiner

*Primary Examiner*—Saul Rodriguez
(74) *Attorney, Agent, or Firm*—Cohen, Pontani, Lieberman & Pavane

(57) ABSTRACT

A pressure plate assembly for a friction clutch includes a housing; a pressure plate held in the housing with freedom to move in the same direction as that in which a rotational axis (A) extends; a stored-energy element; and a wear-compensating device acting in the path of force transmission between the stored-energy element and the pressure plate and/or between the stored-energy element and the housing arrangement, where the wear-compensating device has at least one adjusting element able to move in an adjusting direction to compensate for wear. A clearance-producing arrangement includes at least one gripping element, where the minimum of one gripping element has a body section, one end of which is attached to the assembly consisting of the pressure plate and the housing, between which assembly and the stored-energy element the wear-compensating device acts. The other end of the body section is designed with a blocking section projecting laterally from the body section to act on the wear-compensating device and to interact with a blocking element, which is able to shift position relative to at least part of the gripping element when wear occurs. It is in the area of its body section that the minimum of one gripping element interacts with the blocking element.

5 Claims, 2 Drawing Sheets

PRESSURE PLATE ASSEMBLY

BACKGROUND OF THE INVENTION

1. Field of the Invention

The present invention pertains to a pressure plate assembly for a friction clutch comprising a housing arrangement; a pressure plate held in the housing arrangement with freedom to move axially; a stored-energy element; a wear-compensating device acting in the path of force transmission between the stored-energy element and the pressure plate and/or between the stored-energy element and the housing arrangement, where the wear-compensating device has at least one adjusting element able to move in an adjusting direction to compensate for wear; a clearance-producing device, comprising a gripping element, where the minimum of one gripping element has a body section, one end of which is fastened to the assembly consisting of the pressure plate and the housing, between which assembly and the stored-energy element the wear-compensating device acts, whereas the other end is designed with a blocking section projecting laterally from the body section to act on the wear-compensating device and to interact with a blocking element, which shifts its position with respect to at least one part of the gripping element when wear occurs.

2. Description of the Related Art

A pressure plate assembly of this type is known from U.S. Pat. No. 6,123,180 and is illustrated there in, for example, FIGS. 9 and 10. In this known pressure plate assembly, the wear-compensating device comprises an adjusting ring, and the body section of the gripping element extends approximately in the circumferential direction on the radially inward side of this adjusting ring. The blocking section or gripping section of the gripping element, which projects laterally from the body section, extends radially from the inside toward the wear-compensating device and projects over it radially toward the outside. In this section, i.e., the section extending radially outward beyond the wear-compensating device, the gripping element comes to rest against the blocking element, which is fastened to, for example, the housing arrangement, when wear occurs. When the gripping element, the body section of which is attached to the pressure plate, then moves together with the pressure plate upon the occurrence of wear, the radially outer end of the gripping section, i.e., the blocking section, is held up on the blocking element, and the clearance required for the following wear compensation is created between the gripping section or blocking section and the wear-compensating device.

SUMMARY OF THE INVENTION

It is the object of the present invention to improve the pressure plate assembly of the general type in question in such a way that the wear which has occurred and been detected within the pressure plate is compensated with increased precision.

According to the invention, in the area of its body section that the minimum of one gripping element interacts or can be brought into interaction with the blocking element.

In a departure from the design principle known according to state of the art, according to which the gripping element works together with the blocking element by way of a gripping or blocking section which projects laterally from the body section of the gripping element, the present invention now takes the approach that the blocking element and the gripping element interact with each other by way of the body section of the gripping element itself. It follows from this that the deformation necessarily induced in the area of the gripping element upon the occurrence of wear consists almost exclusively of a bending deformation of the body section and that torsional deformations are almost completely avoided. The consequence of avoiding the torsional deformation of the gripping element is that the extent to which the blocking section is lifted from the wear-compensating device is essentially exactly the same as the extent to which, for example, the pressure plate also moves as a result of wear, a movement which the area of the gripping element cooperating with the blocking element cannot make. In the case of the gripping element known from U.S. Pat. No. 6,123,180, however, the blocking element attacks the gripping element from the side, relative to the body section, upon the occurrence of wear, which means that the gripping element twists, with the result in turn that the gripping element, specifically the area of the gripping element which cooperates with the wear-compensating device, is not completely prevented from moving further along with the pressure plate. Instead, the twisting and the associated tilting allow the gripping or blocking section of the gripping element to move slightly toward the wear-compensating device, so that ultimately the true extent of the wear which has occurred or which has been detected is not correctly represented. Because, in the present invention, the true value is not distorted in this way, the wear which has occurred and which has been detected in the area of a friction clutch equipped with this type of pressure plate assembly can be compensated with precision.

For example, in the pressure plate assembly according to the invention, it is possible for the body section of the minimum of one gripping element to extend essentially in the circumferential direction with respect to the rotational axis, for the blocking section which acts on the minimum of one adjusting element to project radially toward the inside from the body section, and for the blocking element to project radially inward from the outside toward the body section and to overlap it radially to a certain extent. Especially the positioning of the minimum of one gripping element radially outside the minimum of one adjusting element prevents any interfering interaction between the gripping element and the stored-energy element.

To ensure with even greater certainty that, upon the occurrence of wear and thus of the interaction thus induced between the blocking element and the minimum of one gripping element, an undesirable twisting of the gripping element cannot occur, it is proposed that the blocking element overlap the body section at least up as far as the area of a longitudinal center line extending along the body section.

It is also preferable in the pressure plate assembly according to the invention for the minimum of one adjusting element to comprise an adjusting ring, which can move in the circumferential direction to accomplish the adjustment, for the body section to extend in the circumferential direction along or near the radially outer side of the adjusting ring, and for the blocking element to extend radially from the outside toward the adjusting ring.

The present invention also pertains to a friction clutch in which a pressure plate assembly according to the invention is provided.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
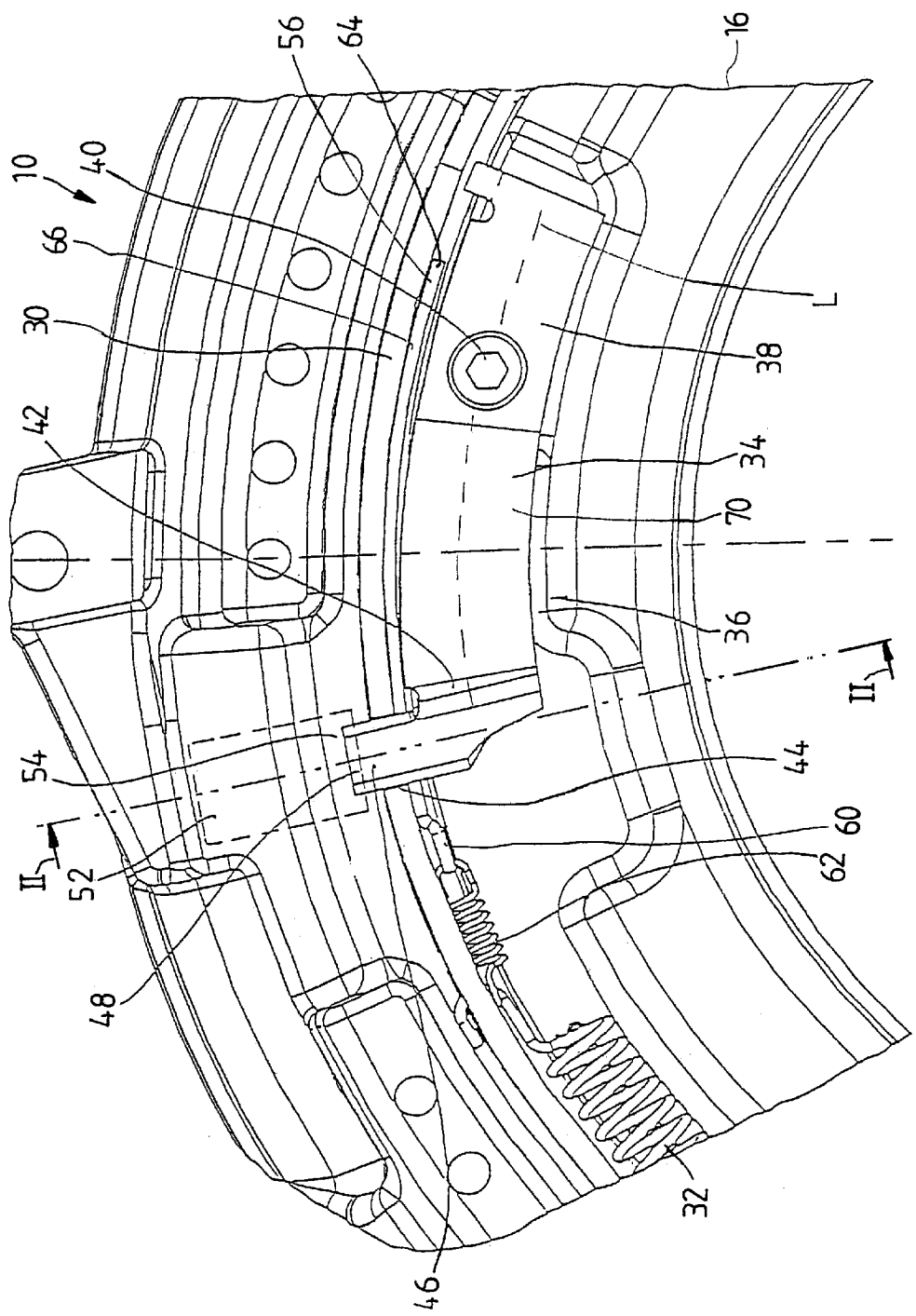
FIG. 1 is a partial axial view of a pressure plate assembly, by reference to which the basic functional principle and the basic design of a pressure plate assembly according to the invention are described
Figure 2:
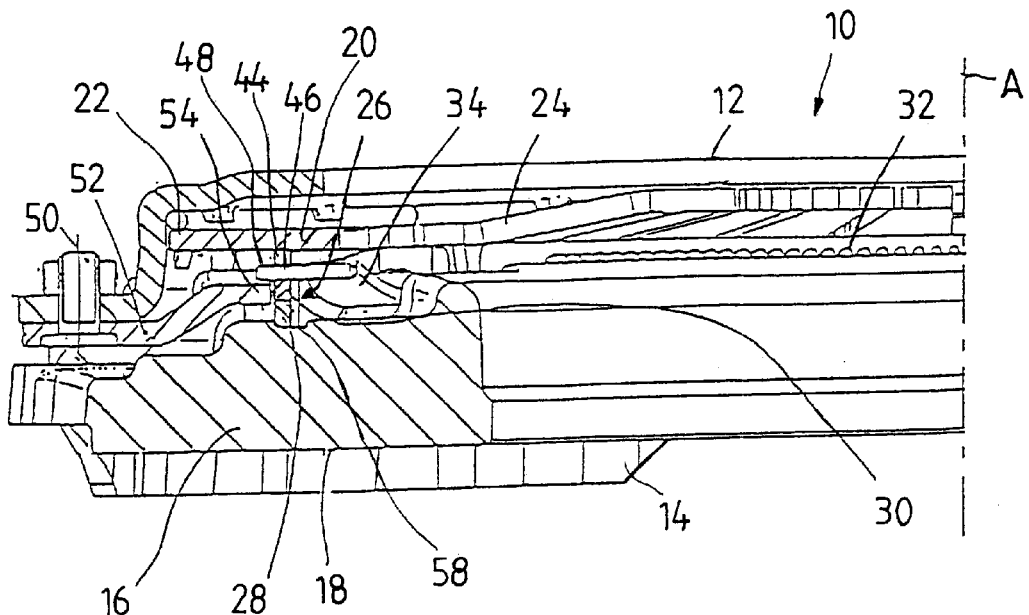
FIG. 2 is a sectional view of the pressure plate assembly of FIG. 1 along line II—II of FIG. 1.

First, the design and function of a pressure plate assembly is described in general with reference to FIGS. 1 and 2. As will be described in conjunction with FIG. 3, the principles of the present invention can also be realized in this pressure plate assembly. Insofar as there are differences between the pressure plate designed according to the invention and the pressure plate assembly described in conjunction with FIGS. 1 and 2, a detailed discussion will be presented below.

The pressure plate assembly 10 shown in FIGS. 1 and 2 comprises a housing 12, which is designed to be attached to a centrifugal mass arrangement (not shown in the figures), such as a one-part flywheel or a possibly a multiple-mass flywheel. A pressure plate 16 is provided inside the housing 12; the friction surface 18 of this plate can be pressed against a clutch disk (not shown in the figures), and the clutch disk can thus be pressed against a corresponding friction surface of the centrifugal mass arrangement. The pressure plate 16 is connected to the housing 12 by elements (not shown) such as tangential leaf springs or the like, so that it is free to move in the same direction as that in which the rotational axis A extends but is essentially prevented from rotating around the rotational axis A with respect to the housing 12.

A stored-energy element 20 is also installed in the housing 12. The radially outer area 22 of this device is supported on the housing 12. The radially inner area, i.e., in the area of the so-called "spring tongues" 24, is designed to be acted on by a release mechanism of the pull type. The radially intermediate area exerts force on the pressure plate 16 by way of a wear-compensating device 26, which will be described further below. It should be pointed out that a stored-energy element 20 and a pressure plate assembly 10 of the pull type are presented only as examples; it is obvious that the stored-energy element 20 could also be supported at a point radially inside the area in which it acts via the wear-compensating device 26 on the pressure plate 16 and thus be acted on by a release mechanism of the push type. In the illustrated design example, the wear-compensating device 26 comprises two adjusting rings 28, 30. Adjusting ring 28 is supported on the pressure plate 16, and the adjusting ring 30 receives the force exerted by the stored-energy element, i.e., by the diaphragm spring 20. The surfaces of the two adjusting rings 28, 30 which face each other are provided with complementary slanted or key-like areas, which create a key-like profile extending in the circumferential direction.

Relative rotation of the two adjusting rings 28, 30 with respect to each other has the result that the total axial dimension of the wear-compensating device 26 is changed. The two adjusting rings 28, 30 are pretensioned for rotation with respect to each other by a helical tension spring 32 installed radially inside the adjusting rings 28, 30. One end of the spring 32 acts on the adjusting ring 28, whereas the other end acts on, for example, the pressure plate 16.

The gripping element 34 of a clearance-producing arrangement 36 is also provided on the pressure plate 16, radially inside the adjusting rings 28, 30. One of the circumferential end areas 38 of the gripping element 34 is fixed by means of a threaded bolt 40 to the pressure plate 16, while the other circumferential end area 42 of the gripping element 34 has a gripping section 46, which extends radially outward through a circumferential and axial slot 44 in the adjusting ring 30. The gripping element 34 is made of elastic material such as spring sheet or plate and is pretensioned in its installed state in such a way that it exerts axial force on the adjusting ring 30 and thus on the entire wear-compensating device 26. As a result of this pretensioning effect, the two adjusting rings 28, 30 are clamped between the gripping section 46 and the pressure plate 16, so that even the pretensioning effect of the spring 32 is unable to cause the adjusting rings 28, 30 to move relative to each other in a rotational direction such that the total axial dimension of the wear-compensating device 26 is increased.

The free end 48 of the gripping section 46 of the gripping element 34 projects over a blocking element 52, which is attached to the housing 12 by means of, for example, a threaded bolt 50 and extends radially inward up as far as the adjusting rings 28, 30. There is therefore a radial overlap, as can be seen especially clearly in FIG. 1, between the end area 48 and a corresponding end area 54 of the blocking element 52.

The gripping element 34 of the clearance-producing arrangement 36 is also provided with an arresting element 56. This arresting element 56 extends radially inside the adjusting rings 28, 30, i.e., rests against their inside circumferential surfaces, and is guided in a corresponding recess 58 in the pressure plate 16, in which recess the adjusting ring 28 resting on this pressure plate 16 is also guided. A second helical tension spring 62 acts on the circumferential end area 60 of the arresting element 56, while the other end of this spring is fastened or hooked to the helical tension spring 32, namely to the end of this spring which cooperates with the adjusting ring 28, which can rotate in the circumferential direction around the rotational axis A, as will be described further below. The adjusting ring 30 is essentially blocked from rotating in the circumferential direction by the gripping element 34, i.e., by its gripping section 46 engaging the slot 44.

Starting from its end area 60 and proceeding to its free end 64, the arresting element 56 becomes larger in the axial direction; that is, it has a key-like shape extending in the circumferential direction between the two ends 60, 64, with the result that the smallest axial dimension is present in the area where the gripping section 46 is positioned over the arresting element 56, as shown in FIG. 1, whereas the largest axial dimension is present in the area near the end 64. Through the action of the spring 62, the arresting element 56 is thus pretensioned in the circumferential direction and forced to move until its key-like surface 66 strikes the gripping section 46 of the gripping element 34 and can therefore no longer move any farther in the circumferential direction.

The way in which the pressure plate assembly 10 according to the invention functions in rotational operating mode, especially upon the occurrence of wear, is described in the following.

In the new, as yet unworn state of the friction linings normally provided on the clutch disk, the two adjusting rings 28, 30 assume a predetermined relative rotational position when the pressure plate assembly 10 is assembled; in this predetermined position, the axial dimension of the wear-compensating device 26 is also the smallest because of the corresponding relative positioning of the slanted surface areas. In this position, furthermore, the spring 32 is under maximum pretension.

In this state, then, as already described, the adjusting rings 28, 30 are arrested with respect to each other by the pretensioning effect of the gripping element 34 and thus unable to rotate. In the engaged state, furthermore, the stored-energy element 20 is acting on the adjusting ring 30, with the result that the pressure plate 16, which in this situation is resting against the clutch disk, and the resulting opposing force provide another blocking effect on the two adjusting rings 28, 30, which also prevents them from moving. The blocking effect provided by the stored-energy element 20 is much stronger, however, because the stored-energy element 20 exerts a force much greater than the pretensioning force of the gripping element 34.

In this new state of the pressure plate assembly 10, it is also possible for the end section 48 of the gripping section 46 to be a certain axial distance away from the opposing end section 54 of the blocking element 52.

When now the friction linings become worn during operation, e.g., after repeated engagements and disengagements, the pressure plate 16 comes closer and closer to the centrifugal mass arrangement when in the engaged state, which, in the illustration of FIG. 2, corresponds to a movement of the pressure plate 16 in the downward direction relative to the to housing 12. As this happens, the end section 48 of the gripping section 46 also moves closer to the blocking element 52. As soon as the amount of wear exceeds a certain value, the gripping section 46 is prevented from moving any farther by the blocking element 52. When additional wear then occurs, therefore, the gripping section 46 will be restrained in the axial direction by the blocking element 52 as the clutch is being engaged and thus lifted away from the adjusting ring 30 as the pressure plate 16 continues to move in the axial direction. A certain amount of axial play is thus created between the gripping section 46, which had previously being resting against the adjusting ring 30, and this adjusting ring 30. Because the stored-energy element 20 is still exerting its force on the adjusting rings 28, 30 during the clutch-engaging process and then in the engaged state, as described above, it is still impossible for any relative rotational motion to occur between the two adjusting rings 28, 30, even though the gripping element 34 is no longer exerting any blocking action. In the state in which the further movement of the gripping section 46 is blocked, the gripping section 46 would then in principle be forced to lose contact with the key surface 66 of the arresting element 56. But because this arresting element 56 is under the pretension of the spring 62, the arresting element is pulled into the gap which forms as soon as the rising movement of the gripping section 46 begins. The result of this is that, when a clutch-disengaging operation now occurs, in the course of which the end section 48 of the gripping section 46 rises axially again from the blocking element 52, the gripping section 46 is unable to make contact again with the wear-compensating device 26, which is still being prevented by the stored-energy element 20 from making an adjusting movement. Initially, therefore, at the beginning of the disengaging process, the clearance between the gripping section 46 and the adjusting ring 30 previously produced by wear remains.

During a subsequent clutch-disengaging process, however, the clamping action of the two adjusting rings 28, 30 relative to each other essentially disappears as a result of the elimination or reduction of the actuating force of the stored-energy element 20; whatever clamping force remains is provided at this point almost exclusively by the tangential leaf springs responsible for the return of the pressure plate 16. The axial pretensioning force of these springs, however, is comparatively weak. The adjusting ring 28 is therefore now able to move in the circumferential direction under the action of the helical tension spring 32; the adjusting ring 30 is prevented from moving in the circumferential direction by the gripping element 34. During this relative rotation between the two adjusting rings 28, 30 and the accompanying sliding movement of the various slanted surface areas along each other, the wear-compensating device 26 changes its axial dimension until the adjusting ring 30 comes to rest again against the gripping section 46. The axial dimension of the wear-compensating device 26 has thus been changed essentially to the same extent as that to which the gripping section 46 was previously raised from the adjusting ring 30, this distance corresponding in turn essentially to the extent to which the pressure plate 16 has moved closer, as a result of wear, to the flywheel arrangement in the engaged state. This means ultimately that, when a compensation process such as this has been completed, the wear which has been compensated is essentially the same as that to which the clearance-producing device 36 responded previously. The result is that the axial distance between the friction surface 18 of the pressure plate 16 and the area or point at which the stored-energy element 20 acts on the wear-compensating device 26 has been increased to the same extent that the thickness of the friction lining has decreased. The installation position of the stored-energy element therefore remains unchanged, even after wear has occurred, and thus there will be no change in the engaging or disengaging force characteristic in this type of pressure plate assembly.

Hooking the spring 62 onto the end of the spring 32, which works together with the moving adjusting ring 28, has the result that, even under increasing wear and increasing circumferential movement of the arresting element 56, the spring 62 does not relax to any significant degree. Instead, it is ensured that the spring 62 is put under tension again by the movement of the adjusting ring 28 which occurs as part of the compensation process—the arresting element 56 being held stationary at this time, so that, when more wear occurs, essentially the same amount of pretensioning force is still available to the arresting device for movement in the circumferential direction.

It should be pointed out that, in principle, the design of the pressure plate assembly with wear compensation which has been described above can be modified in a wide variety of ways. For example, it is possible for the wear-compensating device 26 to have only a single adjusting ring, which, when wear occurs and a compensation process is being performed, can move in the circumferential direction around rotational axis A; the slanted surface areas provided on it thus slide along complementary slanted surface areas on the pressure plate. It is also possible to provide several wear-compensating elements which are capable of moving independently of each other and which do not necessarily have to be in the form of rings. Individual key elements, which are actuated by associated spring arrangements and which cooperate with separate gripping elements, could also be provided.

The pressure plate assembly 10 described in detail above with respect to its design and function is largely the same as the pressure plate assembly described in U.S. Pat. No. 6,123,180. As already explained above, this pressure plate assembly suffers from the disadvantage that, to allow the gripping section 46 of the gripping element 34 to interact with the blocking element 52, the gripping section 46 projects radially outward over the adjusting rings 28, 30 from the body section 70 of the gripping element 34, which extends approximately in the circumferential direction along the inside surface of the adjusting rings 28, 30. Ultimately, therefore, only the end 48 of the gripping element can work together with the blocking element 52. When the end 48 of the gripping element 34 makes contact with the blocking element 52, there will also be some unavoidable torsion of the body section 70 of the gripping element 34 with respect to or around the longitudinal center line L shown in broken line in FIG. 1 as the pressure plate continues to move. In this case, the longitudinal center line can be thought of, for example, as a line which extends between the two ends 38, 42 and which intersects the point or area of attachment by means of the threaded bolt 40. As a result of this forced torsion, the gripping section is also tilted with respect to a plane at a right angle to the rotational axis A; this means that the part of the gripping section 46 working together with the adjusting ring 30 will be able to follow the movement of the pressure plate 16 to a certain small extent. The wear-induced distance traveled by the pressure plate will therefore not be accurately reproduced by the clearance which develops between the gripping section 46 and the adjusting ring 30.

Figure 3:
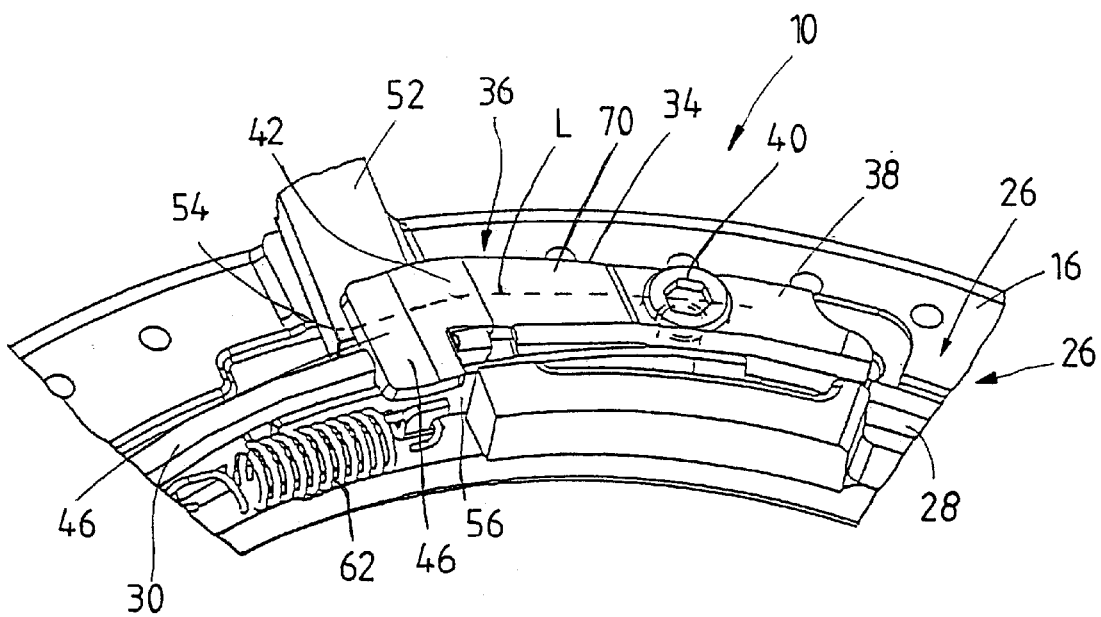
FIG. 3 is a partial perspective view of essential components of the pressure plate assembly according to the invention.

To solve this problem, the arrangement shown in FIG. 3 is provided in accordance with the present invention. It can be seen that, in contrast to the design variant shown in FIGS. 1 and 2, the gripping element 34 is now positioned in such a way that it is essentially radially outside the adjusting rings 28, 30, that is, outside the wear-compensating device 26, and that its body section 70 between the ends 38, 42 now extends approximately in the circumferential direction radially outside these adjusting rings 28, 30. The area of the gripping element 34 previously referred to as the gripping section, which projects laterally from the body section 70, now projects radially toward the inside and has, in the embodiment according to the invention, essentially the function of a blocking section for cooperation with the wear-compensating device 26. This means that the contact of this section 46 with the adjusting ring 30 prevents the wear-compensating device 26 from making an unwanted adjusting movement in the manner described in detail above.

The blocking element 52, which, as can be seen in FIG. 2, for example, can still be provided on or attached to the housing 12, also extends in the embodiment according to the invention radially from the outside up to the wear-compensating device 26, that is, to the adjusting rings 28, 30. With its free end 54, the blocking element 52 now overlaps the end 42 of the body section 70 of the gripping element 34. This radial or, relative to the longitudinal center line L, lateral overlap is preferably large enough that the blocking element 52 extends all the way to the area of the longitudinal center line L of the body section 70 of the gripping element 34. It is even more preferable for the blocking element actually to reach this longitudinal center line L or even to project beyond it in the radially inward direction.

When the pressure plate 16 moves in the axial direction as a result of wear, as described in detail above, the free end 42 of the gripping element 34 which overlaps the free end 54 of the blocking element 52 approaches the blocking element 52 or makes contact with it, and the end 42, along with the end 38 attached to the pressure plate 16, is thus prevented from making any further movement. Because it is now virtually impossible for the forces in question to act off-center on the body section 70, which is designed as a leaf spring element, i.e., off-center with respect to the longitudinal center line L of that section, almost the only deformation of the body section 70 which can now occur is axial with respect to the rotational axis A; torsion around the longitudinal center line L will not occur. As a result, the previously discussed tilting of the section 46, which projects laterally from the body section 70 and serves to block the wear-compensating device 26, will not occur either. The result of this, however, is that the axial clearance which then develops between this section 46 and the adjusting ring 30 when wear has occurred during the operation of the clutch is in fact exactly the same as the extent of the movement of the pressure plate 16, i.e., exactly the same as the distance by which the pressure plate has moved closer to the centrifugal mass arrangement as a result of wear. During the next clutch-release process, therefore, the compensation which is achieved will be precisely equal to this wear-induced movement of the pressure plate.

In the pressure plate assembly according to the invention, therefore, simple redesign measures accomplish the goal of eliminating any distortion which may occur in the detection or compensation of the wear which has actually occurred. It should be pointed out that the principle according to the invention can also be applied when only a single adjusting ring is present instead of the two adjusting rings shown here or when key-shaped elements moving in the circumferential direction, as already mentioned above, are provided instead of rings. It should also be emphasized again that, with respect to other design features not described or illustrated in conjunction with FIG. 3 or with respect to other functional aspects of the assembly not explicitly described in conjunction with FIG. 3, these features and aspects are the same as those of the pressure plate assembly illustrated in FIGS. 1 and 2 and described in detail with reference to this form of embodiment.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate assembly for a friction clutch, comprising
   a housing having an axis of rotation;
   a pressure plate mounted in said housing with freedom to move axially with respect to said housing;
   a stored energy element mounted in said housing and transmitting force along a path from said housing to said pressure plate;
   a wear compensating device in the path of force transmission between the housing and the pressure plate, said wear compensating device comprising at least one adjusting element which is movable in an adjusting direction to compensate for wear, a blocking element which is fixed relative to said housing; and a gripping element having a body section with one end immovably attached to said pressure plate and another end having a gripping section which extends laterally from said body section and acts on said at least one adjusting element to block movement in said adjusting direction before wear occurs, said body section coming into contact with said blocking element when wear occurs.

2. A pressure plate assembly as in claim 1 wherein said body section extends in a circumferential direction with respect to said axis of rotation, said gripping section extending radially inward from said body section to act on said adjusting element, said blocking element lying radially outside of said adjusting element and radially overlapping said body section.

3. A pressure plate assembly as in claim 1 wherein said body section has a longitudinal centerline extending between said ends, said blocking element extending at least as far as said longitudinal centerline.

4. A pressure plate assembly as in claim 1 wherein said adjusting element comprises a ring which moves in a circumferential direction, relative to said axis of rotation, to compensate for wear, said body section extends in the circumferential direction and lies radially outside of said adjusting ring, and said blocking element lies radially outside of said adjusting ring.

5. A friction clutch comprising a pressure plate assembly, said pressure plate assembly comprising a housing having an axis of rotation;

a pressure plate mounted in said housing with freedom to move axially with respect to said housing;

a stored energy element mounted in said housing and transmitting force along a path from said housing to said pressure plate;

a wear compensating device in the path of force transmission between the housing and the pressure plate, said wear compensating device comprising at least one adjusting element which is movable in an adjusting direction to compensate for wear, a blocking element which is fixed relative to said housing; and a gripping element having a body section with one end immovably attached to said pressure plate and another end having a gripping section which extends laterally from said body section and acts on said at least one adjusting element to block movement in said adjusting direction before wear occurs, said body section coming into contact with said blocking element when wear occurs.

* * * * *